A. EPPLER.
WELT GUIDE FOR SHOE SEWING MACHINES.
APPLICATION FILED DEC. 19, 1910.
1,070,122. Patented Aug. 12, 1913.
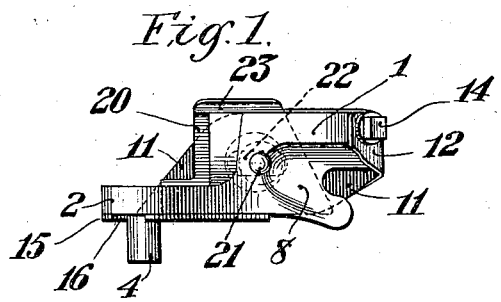
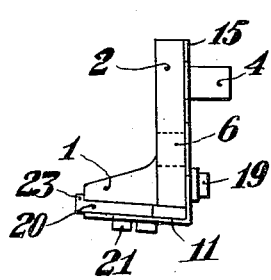
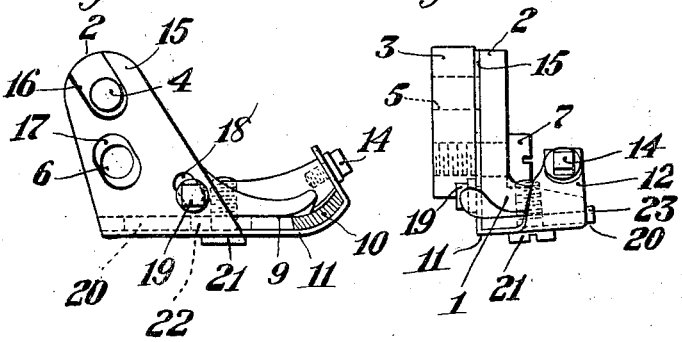
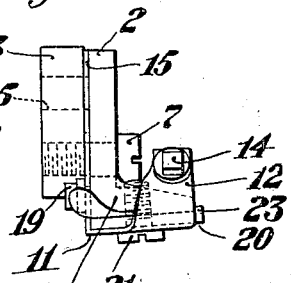
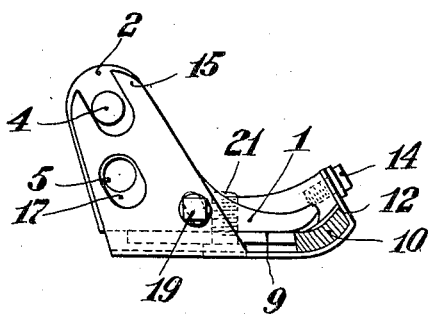
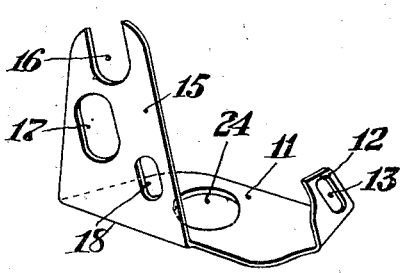
Witnesses
Wm. M. Rheem
George L. Stebbins
Inventor
Andrew Eppler
by his Attorneys
Phillips, Van Everen & Fish

UNITED STATES PATENT OFFICE.

ANDREW EPPLER, OF LYNN, MASSACHUSETTS, ASSIGNOR TO UNITED SHOE MACHINERY COMPANY, OF PATERSON, NEW JERSEY, A CORPORATION OF NEW JERSEY.

WELT-GUIDE FOR SHOE-SEWING MACHINES.

1,070,122.     Specification of Letters Patent.     Patented Aug. 12, 1913.

Application filed December 19, 1910. Serial No. 597,982.

*To all whom it may concern:*

Be it known that I, ANDREW EPPLER, a citizen of the United States, residing at Lynn, in the county of Essex and State of Massachusetts, have invented certain new and useful Improvements in Welt-Guides for Shoe-Sewing Machines; and I do hereby declare the following to be a full, clear, and exact description of the invention, such as will enable others skilled in the art to which it appertains to make and use the same.

The present invention relates to welt guides for shoe sewing machines.

Sewing machines which are designed for attaching a welt to the upper and insole of a lasted shoe are commonly provided with a welt guide through which the welt is guided to properly position it against the lasted shoe. Such welt guides usually consist of a body portion and a guide plate attached thereto to form a welt receiving aperture between the body portion and the guide plate. To provide an adjustment for welts of different widths, it is usual to place an adjustable edge guide between the welt guiding surfaces of the body portion and the guide plate. It has been proposed to provide an adjustment for welts of different thickness by angling over the ends of the guide plate so that the angled end portions lie in parallel planes, and providing the angled end portions with elongated slots through which screws or bolts pass to secure them to parallel surfaces formed on the body portion in the neighborhood of its welt guiding surface. Such a construction is shown, for instance, in my co-pending applications Serial Nos. 447,542 and 482,687, the latter of which has become Patent No. 1,030,721 since the filing of this application. In such a construction the space between the welt guiding surfaces of the body portion and guide plate, where the adjustable edge guide may be placed, is necessarily limited so that either a very small edge guide piece must be used or else the main body of said edge guide piece must be secured at one side of the guiding surface of the body portion and be provided with an edge guiding finger extending between the guiding surfaces of the body portion and the guide plate. Such a construction also provides comparatively small surfaces of contact where the guide plate is clamped to the body portion, and consequently does not provide a particularly strong clamped joint. The use of such small contact surfaces necessitates considerable care to get the two sides of the guide plate adjusted at the same distance from the guiding surface of the body portion. Moreover, since the guide plate is free to turn about its clamping screws when they are loosened, considerable care must be exercised by the operator in adjusting the guide plate to have the guide plate parallel with the guiding surface of the body portion so that the distance between the guide plate and body portion shall not be greater at one mouth of the welt receiving aperture than at the other mouth.

One object of the present invention is to provide improved means for more conveniently adjusting and securing the guide plate to the body portion to accommodate for welts of different thickness.

Another object of the present invention is to provide improved means for more conveniently adjusting the edge guide to accommodate for welts of different widths.

With these objects in view, the present invention consists in the welt guide hereinafter described, as particularly pointed out in the appended claims.

In the accompanying drawings, which illustrate a preferred embodiment of the present invention, Figure 1 is a top view of the welt guide; Fig. 2 is a side elevation of the welt guide looking oppositely to the direction in which the welt is fed; Fig. 3 is a rear elevation of the welt guide; Fig. 4 is a front elevation of the welt guide showing it attached to the welt guide support; Fig. 5 is a view similar to Fig. 2, but showing the guide plate adjusted for a welt of greater thickness; and Fig. 6 is a view taken in perspective of the guide plate detached.

As shown in the drawings, the main or body portion of the welt guide is formed of a substantially horizontal portion 1 and an attaching ear or lug 2 which extends upwardly and slants backwardly in a vertical plane at an angle of about 60° to the horizontal portion and whose right side is flattened to lie against a coöperating flattened surface on a welt guide support 3 carried by the machine. This ear is provided with a dowel pin 4 which is received in a socket 5 in the welt guide support 3 (see Fig. 4) and is also bored to provide an aperture 6 through which a clamping screw 7 is passed to secure it to the support 3. The upper side of the horizontal portion 1 is provided with a notch or recess 8, through which the curved needle of the sewing machine passes in its movement to and from the work. The bottom of the horizontal body portion 1 is formed with a welt guiding surface 9, the front part of which is curved, and the rear part straight. The upwardly extending ear 2 thus slants backwardly in a vertical plane at an angle of about 60° to the surface 9. This guiding surface 9 forms the upper wall of the welt receiving aperture 10, in which the cross section of a welt is indicated in Figs. 2 and 5.

The guiding surface which constitutes the lower wall of the welt receiving aperture is formed by the substantially horizontal middle portion of a sheet metal guide plate 11 which is curved to lie parallel with the guiding surface of the body portion. The front wall of the welt receiving aperture is formed by the lower part of the forward portion 12 of the guide plate 11 which is angled over and bent somewhat backwardly and is provided with an elongated slot 13, through which is passed a clamping screw 14 to secure it to a coöperating flat surface formed upon the front end of the horizontal portion 1 of the body portion. The right-hand side of the guide plate, near its rear end, is formed with an angled-over portion 15, which extends upwardly and lies against the coöperating flattened right-hand surface of the attaching ear 2. This angled end portion 15 is provided with three slots 16, 17 and 18, through which are respectively received the dowel pin 4, the clamping screw 7, and a clamping screw 19 which is designed to clamp the guide plate against the side of the ear 2. The slots 16, 17 and 18 are elongated in a direction parallel to the angled front portion 12 of the guide plate and the slot 13 is elongated in a direction parallel to the angled rear portion 15 of the guide plate. To vary the depth of the welt receiving aperture to accommodate for welts of different thickness, the screws 14 and 19 are loosened, and the guide plate 11 moved relatively to the body portion, and dowel pin 4 and the screws 19 and 14 engaging through their respective slots in the plate 11 and acting as guide pins therefor. When the welt-receiving aperture is adjusted at the correct depth, the screws 14 and 19 are tightened, clamping the guide plate 11 in position. The welt guide is then positioned and secured on its support 3 by the pin 4 and screw 7 which firmly clamp the angled portion 15 of the guide plate between the attaching ear 2 and the support 3.

Lying between the rear part of the welt guiding surface of the body portion and the upper surface of the guide plate is a flat piece 20 forming the rear wall of the welt-receiving aperture and constituting an edge guide for the welt. This edge guide 20 is adjustably secured to the body portion by a clamping screw 21 passing through a slot 22 in the edge guide piece so as to vary the width of the welt-receiving aperture to accommodate welts of different width. The edge guide 20 is secured against turning about the screw 21 by an upwardly extending flange 23 on one edge thereof which engages over the side edge of the horizontal body portion 1. To provide free access to the head of the clamping screw 21 when the guide plate 11 is in position, an aperture 24 is formed through the horizontal portion of the guide plate 11. Since the guide plate 11 is angled over to form the upwardly extending end portion 15 at one side of the edge guide 20, the rear end of the lower surface 9 of the body portion is not restricted, so that an unobstructed space is left for the rearward adjustment of the edge guide 20 and an edge guide piece of considerable size may be employed which may, as illustrated in Fig. 1, extend back of the lower surface 9 and which is much more convenient to adjust than a smaller edge guide piece. The extra rearward space gained by angling over the end 15 at one side also allows sufficient room so that the edge guide piece 20 may be secured directly to the surface 9, obviating the necessity of securing the edge guide piece at one side of the guiding surface 9 with a finger extending over said surface as commonly hitherto constructed.

The use of the two end clamped portions 12 and 15 of the guide plate 11 which lie at right angles to each other constrains the guide plate to move in a line parallel to the line of intersection of the planes in which said two end portions lie, because one of said end portions cannot be turned upon the flat surface against which it lies in a plane parallel to said flat surface without the other end portion being caused to be tilted or inclined with relation to the flat surface against which it normally lies in contact, which tilting or inclination will be prevented since said ends will naturally be pressed into contact with the coöperating surfaces of the body portion when the operator holds the guide plate 11 in place to adjust it. Thus the part of the welt guide plate 11 which forms the welt guiding surface will be maintained parallel with the guiding surface of the body portion when the welt guide is moved for adjustment. The construction of the angled end portion 15 still further insures the parallelism of the welt guiding surface of the body portion and guide plate. Since the angled end portion 15 is comparatively large and lies in a plane substantially normal to the direction of movement of the welt strip through the welt-receiving aperture 10, any tendency of the guide plate to turn whereby the distance between the welt guiding surfaces of the guide plate and the body portion would be greater at one mouth of the aperture than at the other, is obviated. Moreover, since the angled portion 15 is comparatively long and is provided with a plurality of slots spaced along its length, the portion 15 during adjustment will be constrained to move along the flat surface of the attaching ear 2 in the direction of elongation of said slots which is parallel to the angled portion 12 and cannot turn upon said flat surface, so that any twisting which might cause the distance between the guiding surfaces of the guide plate and the body portion at one side of the welt-receiving aperture to be greater than at the other side, is prevented. It is obvious, therefore, that the present improved construction of the guide plate will cause the opposing welt guiding surfaces of the guide plate and body portion to be maintained parallel during the adjustment of the guide plate for different thicknesses of welt, without any particular care upon the part of the operator. Moreover, since the entire side of the attaching ear is flattened, the angled portion 15 can be made large so that a large surface of contact is provided in clamping the guide plate to the body portion, thus insuring a firmer clamped connection than if a small contact surface were provided. The angled end 15 is secured to the side of the attaching ear 2 which lies against the welt guide support 3, so that after the guide piece 11 has been adjusted and secured in position by the bolts 14 and 19, it is still more firmly held in position by being clamped between the attaching ear 2 and the support 3, so that even if the screws 14 and 19 should become loosened, the guide plate nevertheless will be positively held.

The present invention is not limited to the specific embodiment as illustrated and described, but may be embodied in other forms within the spirit of the invention and the scope of the following claims:—

1. A welt guide for shoe sewing machines, having, in combination, a body portion provided with a guiding surface, and having an attaching ear extending at an angle to the guiding surface, one side of said ear being formed with a flat surface, a guide plate having a guiding surface opposing and substantially parallel with the guiding surface of the body portion, said guide plate having one end angled over and lying against the flat surface of the ear, and means to clamp said angled portion of the guide plate against the ear in adjusted relation thereto, whereby the distance between the two guiding surfaces may be varied to accommodate welts of different thickness.

2. A welt guide for shoe sewing machines, having, in combination, a body portion provided with a guiding surface, and two flat surfaces lying at angles to said guiding surface and at substantially right angles to each other, a guide plate having a portion forming a guiding surface opposing and substantially parallel to the guiding surface of the body portion and having end portions angled over and lying parallel to and against said two flat surfaces respectively, and means to secure the angled end portions of the guide plate to the flat surfaces in adjusted relation thereto, whereby the distance between the guide plate and the guiding surface of the body portion may be varied to accommodate welts of different thickness.

3. A welt guide for shoe sewing machines, having, in combination, a body portion provided with a guiding surface and an attaching ear extending at an angle to the guiding surface, said ear having one side thereof provided with a flat surface, said body portion being provided with a flat surface in the neighborhood of its guiding surface and lying at substantially right angles both to the adjacent part of the guiding surface and to the flat surface of the ear, a guide plate having a portion forming a guiding surface opposing and substantially parallel to the guiding surface of the body portion, and having end portions angled over and lying against the flat surface of the attaching ear and the flat surface of the body portion respectively, each of said angled end portions being provided with a slot elongated in a direction substantially parallel with the plane of the other angled end portion, and screws received through said slots and arranged to clamp said angled end portions against their respective surfaces upon the body portion in adjusted relation thereto, whereby the two guiding surfaces may be spaced to accommodate welts of different thickness.

4. A welt guide for shoe sewing machines, having, in combination, a body portion provided with a guiding surface, a guide plate having a guiding surface opposing and substantially parallel to the guiding surface of the body portion and forming a welt-receiving aperture between said guiding surfaces, said body portion being provided with a flat surface lying in a plane substantially normal to the direction of movement of the welt strip through the welt-receiving aperture, said guide plate having a portion thereof angled over and lying against said flat surface, and means for clamping said angled portion to said flat surface having provision for a sliding adjustment between said angled portion and said flat surface, whereby the depth of the welt-receiving aperture may be varied.

5. A welt guide for shoe sewing machines, having, in combination, a body portion provided with a guiding surface and with a flat surface extending at an angle to the guiding surface, a guide plate having a portion forming a guiding surface opposing and substantially parallel to the guiding surface of the body portion, said guide plate also having a portion thereof angled over and lying against the said flat surface of the body portion and having said angled portion provided with a plurality of slots spaced along its length and elongated in a direction at an angle to the guiding surface, members secured to the body portion and acting as guide pins in said slots to prevent the angled portion from turning upon the flat surface when it is moved relatively thereto in the direction of elongation of the slots, and means to clamp said guide plate to the body portion, whereby the distance between the two guiding surfaces may be varied to accommodate welts of different thickness.

6. A welt guide for shoe sewing machines, having, in combination, a body portion provided with a substantially horizontal lower guiding surface, an edge guide secured to the rear part of said horizontal surface and adjustable backwardly and forwardly thereon, a guide plate having a portion lying below and parallel to said horizontal surface, the forward part of said guide plate forming a welt guiding surface to coöperate with the guiding surface of the body portion, and the rear part of said guide plate lying over the edge guide and having a portion angled over at one side of said edge guide and secured to the welt guide body, whereby the rear end of the horizontal surface is left unobstructed for the rearward adjustment of the edge guide.

7. A welt guide for shoe sewing machines, having, in combination, a body portion provided with a substantially horizontal lower guiding surface, an edge guide secured by a clamping screw to the rear part of said horizontal surface and adjustable backwardly and forwardly thereon, a guide plate having a portion lying below and parallel to said horizontal surface, the forward part of said guide plate forming a welt guiding surface to coöperate with the guiding surface of the body portion, and the rear part of said guide plate lying over the edge guide and being provided with an aperture to give access to the edge guide clamping screw, and having a portion angled over at one side of said edge guide and secured to the welt guide body whereby the rear end of the horizontal surface is left unobstructed for the rearward adjustment of the edge guide.

8. The combination of a welt guide support, a welt guide comprising a body portion and a guide plate having opposing guiding surfaces which engage the two faces of the welt strip, and means to secure the welt guide to its support with a portion of the guide plate lying between the support and the body portion of the welt guide.

9. The combination of a welt guide support, a welt guide comprising a body portion and a guide plate, said support and body portion being formed with opposing coöperating flat surfaces, said guide plate being provided with an angled portion lying against said flat surface of the body portion, means to adjust said guide plate parallel to the flat surface of the body portion, and means to clamp said body portion to the support with the angled portion of the guide plate lying between said opposing flat surface.

10. The combination of a welt guide support, a welt guide comprising a body portion and a guide plate having opposing guiding surfaces which engage the two faces of the welt strip and an edge guide for engaging the edge of the welt strip, and means to secure the welt guide to its support with a portion of the guide plate lying between the support and the body portion of the welt guide.

ANDREW EPPLER.

Witnesses:
GEORGE E. STEBBINS,
LAURA MATILDA GOODRIDGE.

Copies of this patent may be obtained for five cents each, by addressing the "Commissioner of Patents, Washington, D. C."